July 15, 1969    R. C. HOWARD    3,455,637
METHOD AND APPARATUS FOR MEASURING THE OPACITY OF SHEET MATERIAL
Filed Aug. 7, 1964    3 Sheets-Sheet 1

July 15, 1969            R. C. HOWARD            3,455,637

METHOD AND APPARATUS FOR MEASURING THE OPACITY OF SHEET MATERIAL

Filed Aug. 7, 1964            3 Sheets-Sheet 2

ROBERT CHARLES HOWARD,
INVENTOR.

By Batchelor & Lewis

July 15, 1969          R. C. HOWARD          3,455,637
METHOD AND APPARATUS FOR MEASURING THE OPACITY OF SHEET MATERIAL
Filed Aug. 7, 1964          3 Sheets-Sheet 3

Robert Charles Howard,
INVENTOR
By Bartelow & Lewis

United States Patent Office 3,455,637
Patented July 15, 1969

3,455,637
METHOD AND APPARATUS FOR MEASURING THE OPACITY OF SHEET MATERIAL
Robert Charles Howard, Arcadia, Calif., assignor to Giannini Controls Corporation, Los Angeles, Calif., a corporation of New York
Filed Aug. 7, 1964, Ser. No. 388,140
Int. Cl. G01j 21/18, 21/30; H01j 39/12
U.S. Cl. 356—204                                    13 Claims

ABSTRACT OF THE DISCLOSURE

Opacity of sheet material is measured automatically and effectively continuously for a moving sheet of material, for example a paper web moving between rollers of a paper making machine. The system computes the ratio of the apparent diffuse reflectance of the illuminated sheet when backed by an absorbing surface to that when backed by a reflecting surface. The conventional integrating sphere for gathering diffuse light from the illuminated surface is replaced by an array of optical light pipes which gather samples of reflected light at different angles. Those samples are combined at a light sensor to give an effective average over a solid angle.

In one type of system the backing is shifted periodically between reflecting and absorbing elements, and a light-attenuating device is periodically included in, and excluded from, the sensed light path in synchronism with such shift. The light attenuator is adjusted, preferably automatically, to make the sensed light intensity independent of the nature of the backing. The value of opacity is then computed from the condition of adjustment of the light attenuator.

In another type of system two distinct areas of the sheet are backed by white and by black surfaces, respectively, and are both continuously illuminated, preferably from a common source. Light is gathered alternately from those two surface areas and is supplied to the light sensor. The light attenuator is provided at any point in the light path that includes one of the surface areas.

---

This invention has to do with the measurement of the "opacity" of paper and similar sheet materials.

As employed in the present specification and claims, the term "opacity" refers to the ratio of the reflectance of paper when backed by a light absorbing surface to its reflectance when backed by a light reflecting surface; and, unless otherwise indicated by the context, the term "paper" will be employed herein to refer to all sheet materials for which such a quantity has significance, whether or not of the nature normally designated as paper. The opacity of paper provides a useful measure of the degree to which printing on the reverse side of a sheet or on successive sheets is visible through the first sheet, and is therefore an important criterion of paper quality for the printing trades.

The value of the opacity of a given material varies somewhat with the detailed technique of measurement and with the nature of the white and black backing surfaces that are used. The standard opacity within the paper industry is defined by the Technical Association of the Pulp and Paper Industry (TAPPI) in their specification T425m-60, and is the value, expressed as a percent, obtained with a specific type of instrument when the black and white backings have respective reflectances of 0.005 and 0.89. That standard value of opacity is designated $C_{.89}$. The standard measuring instrument is manufactured by Bausch & Lomb Optical Company and is described in Patent 1,950,975 issued to Myrl N. Davis on Mar. 13, 1934. Ordinary white printing papers ordinarily have values of $C_{.89}$ in the range from 70 to 100, while values for tracing papers and the like may run as low as 50.

Previously available instruments for measuring opacity, including the standard instrument referred to above, are "open loop" instruments in the sense that the value obtained is affected, in general, by any change of sensitivity or deviation from linearity of response in the light responsive device. An important general object of the present invention is to provide an instrument capable of indicating directly the value of opacity independently of normal variations in response of the light responsive device and of many other components of the system.

A further general object of the present invention is to provide an opacimeter capable of measuring opacity essentially continuously, preferably with sufficiently rapid response to detect regional variations in a sample that is moved continuously and rapidly through the instrument.

Another general object of the invention is to provide an opacimeter that can be constructed in a rugged and durable manner and that can be effectively employed under adverse conditions such as dust, chemical fumes, vibration and the like. The instrument of the invention is thus useful for measuring opacity of paper as it is produced in a paper mill, or for measuring opacity of any sheet product as produced or utilized in chemical or plating mills, for example. Such "on line" measurement of the properties of a product is known to permit product control of a far higher order than can be accomplished when samples of the product must be taken to a laboratory for individual measurement, as has been necessary in the past with respect to control of opacity.

In accordance with one aspect of the invention, those and other purposes are accomplished by providing means for automatically shifting the backing of the sample at the effectively illuminated area between a white and a black surface.

Further, a variable light attenuator, such as a variable neutral density filter, for example, is periodically inserted into the optical system in synchronism with the alternation of the sample backing, in such phase that the light intensity is relatively reduced by a variable factor when the white backing is present behind the sample. Light responsive means are provided for indicating the apparent brightness of the front face of the sample.

The output signal from the light measuring device then in general alternates between two definite values. However, for some definite position of adjustment of the variable light attenuator the two signal values are equal. That is, the alternating current component of the signal goes to zero. The attenuator adjustment for which the system is thus balanced corresponds to the value of the opacity of the sample. A scale, a telemetering transducer, or other output device may be associated with the attenuator to indicate directly the value of opacity corresponding to each adjustment position.

Many types of light attenuators may be employed for the described purpose, as will be described more fully below. In particular, a variable density filter or equivalent device may be physically moved periodically into and out of the light beam in synchronism with the automatic alternation of the sample backing. It is usually more convenient, however, to arrange the optical system so that two alternative light paths are provided at some point between the light source and the described light responsive means, with optical means for switching the effective light periodically between those two paths in synchronism with the alternation of the backing. The variable light attenuator can then be mounted permanently in one of the light paths. Such alternative light paths may be provided by known optical means between the light source and the illuminated face of the sample, for example, or between the face of the sample and the light responsive means that senses its apparent brightness.

In accordance with a further aspect of the invention, the alternative light paths may illuminate separate areas of the sample which are permanently backed by respective reflective and absorbing surfaces. With that arrangement the alternative light paths may be said to include the sample. Although the instantaneous value of opacity obtained with that arrangement is affected, in general, by any lack of uniformity of the paper between the two sample areas, such variation is readily eliminated by averaging over a suitable number of pairs of sample areas. When the instrument is used "on line," as is preferred, such averaging can readily be performed electronically, as will be more fully described.

In accordance with a further aspect of the invention, the alternating current output signal from the light responsive device is amplified, preferably by means of a stable amplifier of alternating current type, and the amplified signal is employed to drive the light attenuator to null position. That arrangement provides closed loop operation, the scale associated with the attenuator indicating continuously the value of the opacity. The accuracy of that indication is independent of such factors as the brightness of the light source and the sensitivity and linearity of the light responsive device and of the amplifier.

A further aspect of the invention provides a "white" backing surface structure of improved accuracy and reliability. In previous opacimeters the standard white backing has been a plane, diffusely reflective surface having a reflectivity of essentially 0.89. That surface has usually comprised a body of magnesium carbonate in direct contact with the sample or with an intervening glass surface. Such a structure is especially sensitive to contamination and physical damage. Moreover, the reflectivity depends upon the pressure between the glass or sample and the magnesium carbonate. In accordance with the present invention the usual diffusely reflective surface of the prior art is replaced by a specularly reflective surface, such as a transparent plate silvered on the back face or a front surface mirror of high reflectivity. That reflective surface may be plane and spaced closely adjacent but out of contact with the paper sample, or may be of such concave form that light transmitted by the sample is focussed back upon its rear surface. By suitable selection of the mirror surface and of its spacing with respect to the sample, the effective reflectivity can be made essentially equivalent to the diffuse reflectivity of 0.89 specified by the TAPPI standard. It is ordinarily preferred that the value of opacity given by the instrument of the invention correspond closely to $C_{.89}$, defined above. However, with suitable modifications, the invention can also indicate opacities based on other values of reflectance.

In accordance with a further aspect of the invention, novel optical means are provided for sensing the apparent reflectivity of the front face of the illuminated sample. In place of the conventional "integrating sphere" of the prior art, the present system preferably employs a plurality of discrete light receivers which sample the light leaving the illuminated sample surface at respective finite angles. Those receivers are so arranged that the respective light intensities which they receive provide an accurate approximation of the relative intensity that would be obtained by means of an integrating sphere. The light at each receiver may be sensed by an independent photocell or equivalent device, and the output signals from those devices summed or averaged electrically. It is preferred, however, to conduct the light from each receiver, as via a bundle of optical fibers, for example, to a common light responsive device, thus summing the light optically rather than electrically. The resulting system can be designed to be satisfactorily stable, particularly against dirt and chemical fumes, and is readily cleaned when necessary without altering its optical properties.

A further aspect of the invention provides illumination of the sample light by a light beam of elongated section, rather than by the usual circularly symmetrical beam of the prior art. Such two-dimensional optical geometry is particularly convenient and effective in combination with the described use of a concave specular reflector as the white backing behind the sample, and with the described use of discrete light sampling techniques for sensing the apparent brightness of the front surface of the sample. The two-dimensional geometry also provides increased flexibility of design with respect to such variables as the time constant for overall response when the system is employed as an on-line opacimeter with continuously moving sample.

A full understanding of the invention and of its further objects and advantages will be had from the following description of certain illustrative manners in which it may be carried out. The particulars of that description, and of the accompanying drawings which form a part of it, are intended only as illustration and not as a limitation upon the scope of the invention, which is defined in the appended claims.

Figures 1, 2, 3, 4:
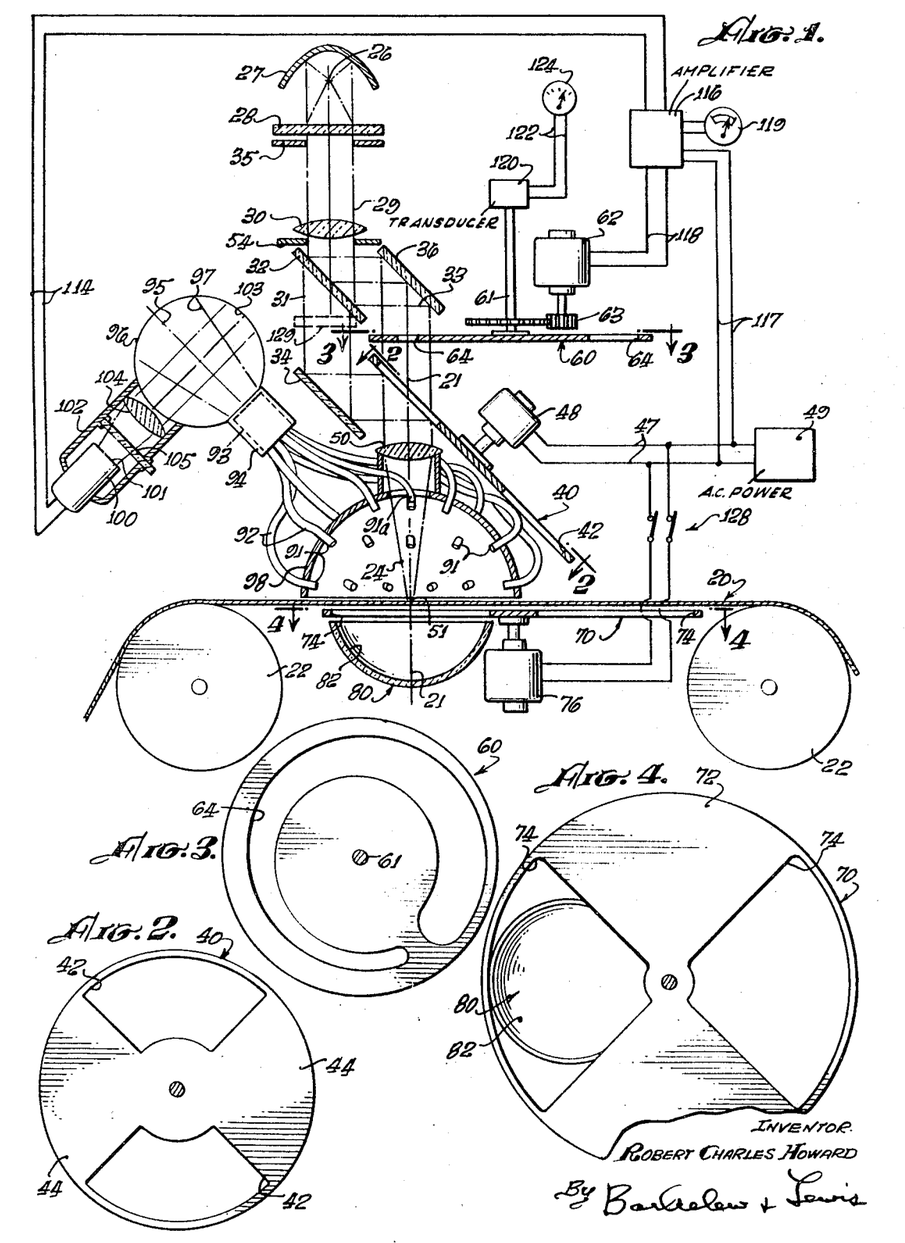
FIG. 1 is a schematic drawing representing an illustrative embodiment of the invention.
FIG. 2 is a detail section on line 2—2 of FIG. 1.
FIG. 3 is a detail section on line 3—3 of FIG. 1.
FIG. 4 is a detail section on line 4—4 of FIG. 1.

In the illustrative system shown schematically in FIG. 1 the sheet material of which the opacity is to be determined is represented at 20 and is confined to a predetermined plane by guide means represented as the two feed rollers 22. Those rollers may be part of the drive mechanism of a paper making machine, and may be supplemented by other guide elements, not shown. The plane of sheet 20 is typically horizontal, and will be so assumed fo convenience of description, though other orientations may be used if preferred.

A small area of the upper surface of sheet 20 is illuminated by the light beam 24, which may be produced by a wide variety of optical systems. As shown, the light source 26 is focussed by the concave mirror 27 upon a diffusing surface 28, which may, for example, comprise a sheet of opal glass. Light from a uniformly illuminated area of diffuser 28 is selected by diaphragm 35 and is directed by the lens 30 upon the partially reflecting plane mirror 32, fixedly mounted at an oblique angle typically 45°. That mirror divides the initial light beam 29 into respective transmitted and reflected beams 31 and 33. Those beams are brought together at right angles by the fixed plane mirrors 34 and 36. At the crossing point of the two beams the rotating reflective shutter 40 either reflects beam 31 to the lens 50 or transmits beam 33 to that lens, depending upon the rotary position of the shutter.

Shutter 40 typically has two open sectors 42 and two reflective sectors 44, as shown best in FIG. 2. The open sectors of the shutter may comprise actual apertures in the shutter disk, as shown for clarity of illustration. Alternatively, the shutter disk may be continuous, the reflective and transmissive sectors being formed, for example, by applying suitable coatings to the respective areas of the shutter. The shutter is typically mounted directly on the shaft of the synchronous motor 48, by which it is driven at definite speed and in definite phase relation to the alternating current power supply. That current is supplied to motor 48 via the lines 47 from a suitable source of conventional type indicated at 49. Power source 49 may supply ordinary 60 cycle alternating current, or may comprise an electronic oscillator, for example, which supplies alternating current of any desired frequency.

The lens 50 forms the beam 24, already mentioned, which illuminates a definite area of the upper surface of sheet 20. The beam axis 21 is shown perpendicular to the sheet, but a somewhat oblique angle may be employed if preferred. Lens 50 typically forms on sheet 20 an image 51 of the diaphragm 54, which is placed in beam 29 adjacent lens 30. The size and form of image 51 is then readily controlled by selection of the diaphragm aperture. Shutter 40 causes image 51 to be formed alternately by light from beam 31 and by light from beam 33. Since the optical distance between lens 50 and diaphragm 54 is essentially the same by both of those light paths, the size and position of image 51 are not affected by that light switching. The relative brightness of the images formed via the two light paths depends primarily upon the ratio of the reflection and transmission of fixed mirror 32, which can be controlled within wide limits by well known manufacturing techniques. For convenience of description, it will be assumed that beams 31 and 33 are initially equally intense, which is generally preferred. The necessary modifications if that is not true will be evident.

Mechanism of any desired type is provided for variably attenuating at least one of the two light beams 31 and 33 between mirror 32 and shutter 40. As shown, the rotary disk is mounted on a shaft 61 and is driven by the motor 62 via the speed reduction gearing indicated at 63. Beam 33 perpendicularly intersects disk 60 near its periphery, a portion of the light passing through the tapered circular slot 64. The effective width of that slot at the light beam varies with the rotary position of the disk, as shown best in FIG. 3. Hence disk rotation varies the ratio of the intensity of image 51 when formed by light from beam 31 to its intensity when formed by light from beam 33. The available range of that variation may be selected as desired by suitable design of attenuator slot 64. Attenuator disk 60 is typically positioned in light beam 33 substantially at the image of diaphragm 35 that is formed by lens 30. The form of that image on disk 60 then corresponds to the diaphragm aperture, and its brightness is made uniform typically by action of diffuser 28. The uniform brightness of the image insures that the light passed by attenuator 60 in each rotary position is proportional to the effective width of slot 64.

Means are provided for alternately inserting immediately below sheet 20 an effectively white surface and an effectively black surface. Such surfaces may, for example, be mounted on a carriage and moved back and forth in translation by a crank mechanism of conventional type. In the present embodiment the black surface comprises the face of the rotary shutter 70, which has two black sectors 72 and two open sectors 74, as shown best in FIG. 4. Shutter 70 is typically mounted directly on the shaft of the synchronous motor 76. Motors 62 and 76 are typically both polarized reluctance synchronous motors and are powered from the same alternating current source 49; or otherwise arranged to operate in locked synchronous relation. Shutter 70 then rotates in synchronism with reflective shutter 40, already described, and in definite phase relation therewith. That phase relation is so arranged in the present embodiment that an open sector 74 of shutter 70 is present below the illuminated area of sheet 20 when an open sector of shutter 40 is in position to transmit beam 33 to lens 50. Similarly, a black sector 72 is inserted below sheet 20 when lens 50 receives light from beam 31.

The black sectors of shutter 70 may typically be covered with black velvet or similar material if maximum light absorption is desired and if the instrument is to be used under conditions which do not cause deterioration of such a surface. If the instrument is designed for "on-line" use in a paper mill, for example, it is usually preferable to paint sectors 72 with a glossy black paint, which is relatively durable and easily cleaned. Whereas the reflectance of such a surface is appreciably greater than the value of 0.005 specified by the TAPPI standard, the resulting small effect upon the measured opacity can be largely compensated, as by suitable modification of the output scale.

The "white" backing surface in the present embodiment comprises the concave specular reflector 80, which is placed immediately below shutter 70 and coaxial with the beam 24. Mirror 80 may be of glass with its rear surface silvered in conventional manner, or there may be applied to the front face of the mirror a suitable highly reflective and durable coating 82, such, for example, as the coatings normally applied to first surface mirrors for optical systems. Reflector 80 may be spherical, as indicated in FIGS. 1 and 4, and is preferably positioned with its center of curvature substantially at the center of the illuminated area of sheet 20. With that arrangement, when shutter 70 is open, as shown, any light transmitted by sheet 20 within an angle of at least approximately 80 degrees of the vertical is reflected back to the underside of the sheet. A symmetrical image at 51 is effectively imaged back on itself by mirror 80.

Figure 5:
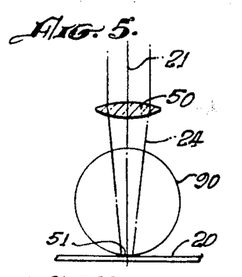
FIGS. 5 and 6 are schematic diagrams representing illustrative types of angular light distribution.

To comply with the specified standard for measuring opacity, the light sensing device for measuring the apparent reflectivity of the upper face of sheet 20 should produce a signal that accurately represents the sum of all angular components of light leaving the illuminated area. The apparent reflectivity of the sheet is due to the sum of light from beam 24 directly reflected by sheet 20; and light that is transmitted by the sheet, reflected by the backing (or multiply reflected by the backing and paper) and again transmitted by the sheet. Many types of paper for which opacity is an important factor produced practically complete diffusion of both the directly reflected light and the doubly transmitted light. The angular distribution of the light to be sensed then approaches that indicated schematically in FIG. 5 by the polar plot 90, the intensity being a maximum normal to sheet 20 and decreasing smoothly to zero in a direction parallel to the sheet surface. The light sensing mechanism of FIG. 1 takes advantage of the gradual variation of that angular distribution. Instead of summing all of the light from image 51, as by an integrating sphere or the like, the system of FIG. 1 provides a plurality of discrete light receivers 92 which sample that light at respective definite angles. The resulting light samples are then summed in any convenient manner.

In the present embodiment the light receivers comprise bundles of optical fibers such as are described, for example, by Narinder S. Kapany in Appendix N of "Concepts of Classical Optics" by John Strong, published in 1958 by W. H. Freeman & Company Inc. Alternatively, each bundle of optical fibers may be replaced by a single rod of transparent plastic or the like with polished side walls. Light entering one end of such a "light pipe" within a certain angle of the longitudinal axis is transmitted almost without loss to the other end, where it is emitted at a corresponding angle if the ends are suitably polished. That action is essentially unaffected by curvature of the fiber, so long as the radius of curvature is very large compared to the fiber diameter. In accordance with the present invention, the input ends 91 of the fiber bundles are arranged radially with respect to image 51 as a center, and are angularly spaced in any appropriate manner (see below). Extraneous light is excluded by a light shield 98 which is apertured to receive the light pipes. The inner surface of shield 98 is preferably a dull black. The other ends of the bundles are gathered together in parallel relation, as in the cylindrical tubular fitting 94. The light samples are thus effectively transferred from the diverse angular relation in which they were picked up into essentially parallel relation in a common light beam emitted along the axis 95 of fitting 94. A photoresponsive device such as a photocell may be placed on that axis facing the output ends of the fiber bundles, and will then be substantially equally responsive to light from each of the fibers.

A preferred manner of gathering the light from all the fiber bundles is to inject it into an integrating sphere 96 and to mount the light responsive device in suitable relation to that sphere, as indicated schematically at 100. Device 100 may comprise a photocell, a phototransistor, a photomultiplier, or any other device capable of producing an electrical signal representing the total illumination upon its sensitive surface. Although it is preferred that the output be essentially linear, an important advantage of the present invention in its preferred form is that the accuracy of the opacity measurement does not depend upon such linearity. The spectral response of device 100 is preferably closely similar to that of the human eye. If the device has a different inherent response, that may be adjusted in known manner by insertion of one or more filters having suitable differential transmission, as indicated at 105. Similar spectral adjustment will be assumed in other embodiments to be described. The sensitive face 101 of device 100 may, for example, be mounted in a sleeve 102 in radial relation to sphere 96, so that it is exposed to a limited area 103 of the sphere surface which is spaced both from the fiber ends and from the direct beam 97 emitted by them. The area 103 "seen" by device 100 may be conveniently defined by use of a lens, as indicated at 104, or by simple aperture of conventional type. Sphere 96 may conveniently be of solid form, typically of transparent plastic material such as a methacrylate polymer of the type known commercially as "Lucite." The spherical surface of sphere 96 is then painted with a material of high non-specular reflectivity such as powdered magnesium carbonate in a suitable binder. If sphere 96 is hollow, it is preferably hermetically sealed to exclude dust and chemical fumes.

The described use of an integrating sphere at 96 between the light pipes and the light sensor does not involve the difficulties presented by a conventional integrating sphere for directly gathering the light from image 51. In particular, the working surface of sphere 96 is completely isolated from dirt and abrasion, and the entire structure is separated from the moving sheet 20. Moreover, there is no problem of scattering of the primary light beam 24 by the solid body of the sphere.

The output signal from light sensor 100 is transmitted via the lines 114 to an alternating current amplifier and demodulator 116. The light signal contains an alternating current component, which may be essentially a square wave, of the frequency of alternation of the white and black backing produced by motor 76. That frequency in the present instance is twice the common frequency of rotation of shutter 70 and shutter 40. That alternating current component is an error signal of which the amplitude and sense correspond to the difference in apparent brightness of the illuminated sheet when backed with "black" and subjected to full illumination via beam 31, and when backed with "white" and subjected to attenuated illumination via beam 3. The frequency of alternation between reflective and non-reflective backings may be considered as the carrier frequency of the error signal.

That error signal is amplified by amplifier 116, which may be responsive only to the carrier frequency. The amplified output is then applied to an amplitude and polarity detector, such as a phase sensitive demodulator, which requires a reference phase in synchronism with the carrier frequency. This may be derived from the alternating current output of source 49 supplied via lines 117. This reference phase might alternatively be derived from a commutating mechanism on the shaft of motor 76 or motor 48. In the latter case the shaft speed could be chosen to be any convenient value. The phase sensitive demodulator may comprise an alternating current motor at 62, or may be incorporated in amplifier 116 and produce a direct current which is again amplified to drive a direct current motor at 62. Motor 62 drives the attenuator disk in a direction to reduce the amplitude of the error signal. The attenuator is thereby maintained in a position of adjustment that continuously represents the actual opacity of sheet 20 at the area of image 51. That opacity value may be read out by a suitably calibrated scale of conventional type associated with shaft 61; or shaft 61 may be connected to a transducer 120, such as a potentiometer, a synchro transmitter, or the like, which produces an electrical opacity signal on the lines 122. Such a signal may be employed for any desired control function, or may be displayed as a visual indication on a suitably calibrated remote meter 124.

It is sometimes desirable to provide a visual meter 119, connected to amplifier 116 to indicate the amplitude and polarity of the error signal. An operator can then balance the system by manually adjusting variable attenuator 60 to null the error signal. Motor 62 can then be omitted. The resulting system has many of the advantages of a closed loop system, while avoiding an actual servo drive.

The arrangement of light receivers shown somewhat schematically in FIG. 1 provides a substantially uniform distribution of receivers over the surface of a hemisphere. That type of distribution is particularly effective when the image 51 is essentially circular. Such a generally spherical distribution may be approximated satisfactorily with a considerably smaller number of receivers than are indicated in FIG. 1. For clarity of illustration, only a representative number of light pipes 92 is shown explicitly in that figure.

Figure 6:
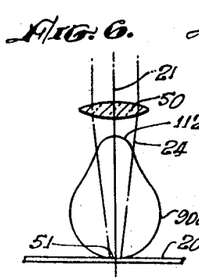

Many types of printing papers have a glossy surface, which acts to a greater or lesser extent as a specular reflector for incident light. With such papers the light leaving the illuminated area has an angular distribution of the type represented at 90a in FIG. 6, with a more or less pronounced peak 112 in the direction corresponding to specular reflection of incident beam 24. Different values of opacity are obtained for such papers according as that peak is taken into account or neglected. The former value corresponds more strictly to the standard definition of opacity, while the latter may be preferred for certain purposes as representing more closely the practical situation of viewing a printed page, which is normally held at angle that avoids the specular reflection.

In the system of FIG. 1, the specularly reflected light may be detected by placing one or more of the light receivers close to the optical axis 21. As illustrated, one receiver 91a is placed directly on that axis in the center of incident beam 24. Such a receiver obstructs only a negligible proportion of the entire lens aperture, and if it is reasonably close to the plane of the lens it does not significantly affect the uniformity of illumination of the image 51. With such an axial receiver the value of opacity includes the specularly reflected light. If it is preferred to neglect such light, receiver 91a may be omitted. An alternative manner of taking account of the specularly reflected light is to arrange the axis 21 of the incident beam at a slightly oblique angle to the paper, sufficient that the specularly reflected light is angularly spaced from the incident light.

Although opacity values measured with the described system are independent of normal variations of many components of the system, due to its closed loop operation already described, other components are outside the closed loop. Many of those "open loop" components can conveniently be checked and the system adjusted if necessary to compensate any variations that may be detected. That may be accomplished by operating the system with an opacity standard sample in place of strip 20 and noting any deviation of the indicated opacity from the known value of the standard. Alternatively, for example, motor 76 may be temporarily stopped, as by opening the switch 128 in its power line. With mirror 70 thus stopped and with shutter 40 still rotating, attenuator 60 is driven to null position in the manner already described. That null position should correspond to an opacity value of 100. If it does not, the system may be adjusted, as by manipulation of a variable attenuator in the beam 31. Such an attenuator is indicated schematically at 129. It may be similar to attenuator 60, but does not ordinarily require any automatic drive.

A further illustrative embodiment of the invention is shown schematically in FIGS. 7 to 10. Many features of this embodiment are similar to that already described, and do not require repeated illustration or description. In this embodiment the light image 51a on sheet 20 is elongated and generally rectangular in shape. That image is formed by the lens 120, and is typically a real image of the elongated diffuse light source 122. The primary optical system of this embodiment is thus far simpler than that previously described.

Figure 9:
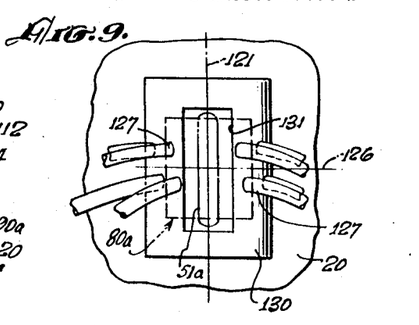
FIG. 9 is a section on line 9—9 of FIG. 8.
Figure 10:
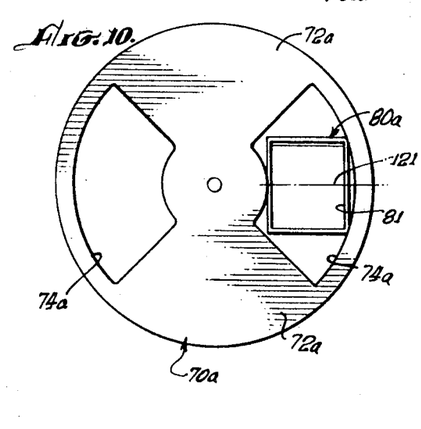
FIG. 10 is a section on line 10—10 of FIG. 7.

With that general form of image, the "white" backing structure is typically a concave mirror 80a of cylindrical shape, with its cylindrical axis essentially coinciding with the image axis 121 (FIG. 9). The inner surface of mirror 80a is typically coated with a suitable highly reflective material, and reflective plane end walls 81 are provided perpendicluar to the cylindrical axis of the mirror and spaced inwardly of the ends of image 51a. Between reflector 80a and the lower face of sheet 20 is placed a shutter 70a, corresponding generally to shutter 70 of the previous embodiment, with openings 74a and black blades 72a. That shutter is driven at a definite speed by the synchronous motor 76a from an alternating current power source 49a.

With the described elongated form of image 51a, shutter 70a is preferably positioned with image axis 121 essentially radial with respect to the shutter shaft. A smaller angular movement of the shutter is then required to move a blade edge from a position effectively clear of light transmitted from image 51a to a position intersecting effectively all of the transmitted light. When the shutter is "open," light transmitted from image 51a through sheet 20 is effectively focussed back upon the underside of the sheet by cylindrical mirror 80a in the plane of FIG. 8. In view of that optical focussing, the reflected light is held essentially within even the relatively small width of image 51a. In the axial plane of FIG. 7 there is no directly corresponding optical focussing. However, provided that the image extends beyond the ends walls 81 of the mirror, those end walls form virtual images of the light in such a way that the length of image 51a is effectively extended to infinity. In view of that infinite effective length of image 51a, cylindrical mirror 80a reflects the transmitted light satisfactorily in the axial plane of FIG. 7, returning essentially as much light to each element of the length of image 51a as in the case, for example, of a plane mirror immediately behind an infinitely long image.

The apparent reflectance of sheet 20 at image 51a is sensed by sampling the light emitted from the image in a plane that bisects its length. That plane is indicated at 126 in FIG. 9, and is the plane of the paper in FIG. 8. Light receivers 127 are arranged approximately in that plane, oriented radially with respect to the axis of the image, and angularly distributed essentially uniformly about that axis. In order to permit the light receivers to be placed close to the image in a radial direction, they may conveniently be staggered axially, alternate receivers being offset slightly on opposite sides of plane 126, as shown best in FIG. 9. The light shield 130, which corresponds generally to 98 of the previous form, is apertured at 131 and is preferably black and of cylindrical form with closed ends. The entrance angle of each receiver typically embraces more than the full width of image 51a, but limits the field of view to only a portion of the length of image 51a within the length of cylindrical reflector 80a.

Due to the relative length of image 51a, the light entering each receiver 127 is essentially equivalent to a sample of light that would be received from an infinitely long image. It is essentially for that reason that sampling in one transverse plane is fully effective. By thus taking advantage of the two-dimensional nature of the image, the total number of sampling receivers is greatly reduced and the structure correspondingly simplified.

Figure 11:
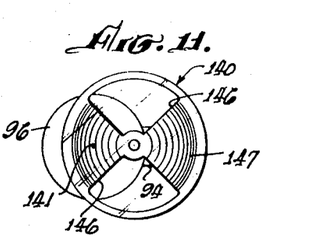
FIG. 11 is a section on line 11—11 of FIG. 7.

In the present embodiment, as in the previous one, the light from each receiver is typically delivered to an integrating sphere via a suitable light pipe, and the brightness of a typical area of the sphere is sensed by a light responsive device 100. In the present form, however, a variable light attenuating device is periodically inserted into the light path between the sphere and the light detector in synchronism with the action of shutter 70a. That light attenuator is shown as the transparent disk 140 mounted on the shaft of the synchronous motor 142. Motor 142, which is driven in synchronism with shutter motor 76a, is fixedly mounted on the bar 144. That bar is slidable longitudinally in brackets indicated schematically at 145. That sliding movement varies the radius at which the optical axis 141 of light sensor 100 intersects disk 140. The disk is divided into sectors 146 that are entirely transparent and sectors 147 that carry a light absorbing coating, indicated schematically in FIG. 11. That coating has an effective density that varies with the radius from the disk axis, such variation being typically linear. At any given radius, the coating density is uniform, so that rotation of the disk does not affect the transmitted light except as between the sectors 146 and 147. Disk 140 is driven in synchronism with shutter 70a in such phase relation that disk 140 is open when shutter 70a is closed. Hence when sheet 20 is backed by a black shutter blade, disk 140 transmits essentially the full brightness of sphere 96 to light sensor 100. And when sheet 20 is backed by the "white" mirror 80a, disk 140 absorbs a variable fraction of light, depending upon the translational position of the disk assembly along the travel of rod 144.

That position is preferably determined automatically by a servo motor, driven in accordance with the alternating current component of the signal from sensor 100, in a manner already described with respect to the previous embodiment. As illustratively shown in FIG. 7, bar 144 carries rack teeth 148 by which it is driven by the servo motor 150 via the gear reduction indicated at 149. Amplifier 152 receives the error signal from sensor 100 and controls motor 150 in such a way as to drive the translation of disk 140 to reduce the amplitude of the error signal. At null position, insertion of light attenuator 140 just compensates the effect of shifting between "black" and "white" backing behind sheet 20. An output device 154 may be linked in any desired manner with the gear drive 149 to indicate the instantaneous value of opacity.

Figures 12, 13:
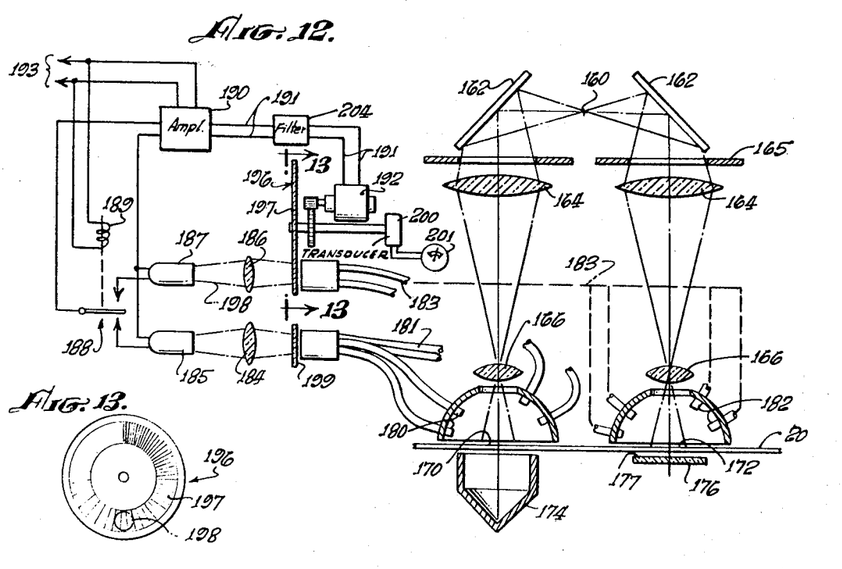
FIG. 12 is a schematic drawing representing a further embodiment of the invention.
FIG. 13 is a section on line 13—13 of FIG. 12.

FIGS. 12 and 13 represent schematically a further embodiment of the invention, in which two distinct areas of the sheet 20 are continuously illuminated by respective optical systems from a common light source 160. Each optical system comprises an oblique plane mirror 162, a collecting lens 164 with aperture-defining diaphragm 165, and an objective lens 166 which forms on sheet 20 an image of the diaphragm. The images are designated 170 and 172. Immediately behind sheet 20 at image 170 is fixedly mounted a "black" backing 174, shown as an enclosure with blackened inner surfaces and acting as a light trap. Mounted behind the image 172 is a plane reflector 176, indicated as a flat glass plate with a reflective coating on its front face 177. Plane mirror 176 is ordinarily positioned as close to the rear face of the paper as possible, care being taken to avoid abrasion of the mirror surface if the paper is in motion. However, the effective reflectivity of the mirror can be reduced if desired, for example to make it essentially equivalent to that of a diffuse white surface, by increasing the mirror spacing from the paper.

Figure 7:
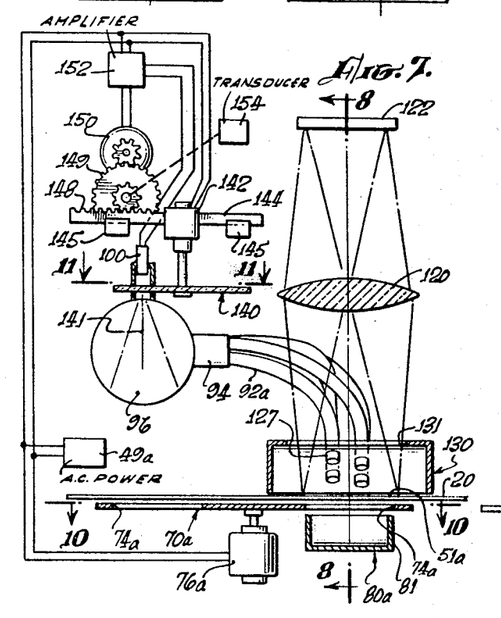
FIG. 7 is a schematic drawing representing another embodiment of the invention.
Figure 8:
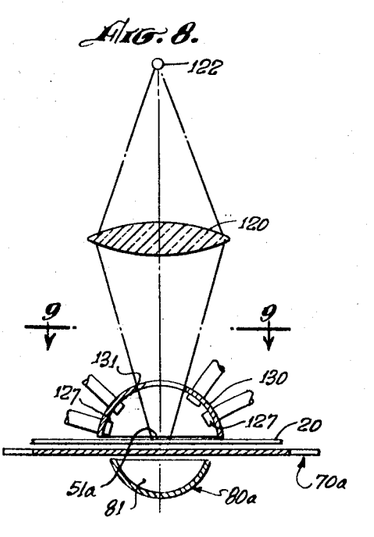
FIG. 8 is a section on line 8—8 of FIG. 7.

If desired, the open shutter areas 74 in FIG. 1 and 74a in FIG. 7 may be replaced by plane reflective surfaces, concave reflectors 80 and 80a being then unnecessary. The black shutter sectors may then be replaced if desired by openings in the shutter disks which open into an effectively black chamber of any desired type behind the illuminated paper area.

Returning to the present embodiment, the apparent reflectivities of the illuminated areas of sheet 20 are sensed by the respective sets of light receivers 180 and 182, which perform essentially the function of an integrating sphere, in the manner already described. Light from receivers 180 is collected, as by the light pipes 181, and is focussed by the lens 184 upon the sensitive face of a light responsive device 185. Light from receivers 182 is similarly collected by light pipes indicated schematically at 183, and focussed by the lens 186 upon the sensitive surface of a sensing device 187, which is closely matched to 185. The alternating current amplifier 190 receives its input signal alternately from the light sensitive devices 185 and 187 via the chopper switch 188, which is periodically driven at a definite frequency in known manner by the electromagnetic winding 189. That winding is energized by alternating current from a source 193, typically at 60 cycles per second. The alternating component of the input signal to amplifier 190 is amplified and is demodulated with respect to the reference phase provided by the alternating current supply. The resulting direct current is supplied via the lines 191 to the motor 192.

A variable light attenuator is provided in the light beam 198 between light pipes 183 and photosensitive device 187. That attenuator is represented as a transparent disk 196, driven by motor 192 and carrying on one of its faces a coating 197 of varying optical density. That coating may be confined to the annular area of the disk of radial width at least equal to the width of the light beam 198, is indicated in FIG. 13. The density of coating 197 varies progressively around the disk. Such variable density coatings can be formed, for example, by depositing metal by evaporation in vacuum while rotating the disk at a controlled variable rate. The variable density coating is in many respects equivalent functionally to the slit 64 in disk 60 of FIGS. 1 and 3, already described, and can replace the latter, if desired. The variable density filter has the advantage that, by suitable selection of the dimensions, the degree of attenuation of the light beam can be made essentially independent of the light distribution within the beam. The light attenuation of beam 198 due to the least dense area of disk 196 may be compensated if desired by inserting a suitable filter of constant density in the light from the other set of light pipes 181, as indicated at 199. Filter 199 may be variable, if desired, for calibration of the system.

In operation of the system of FIG. 12, if the light beams reaching the respective sensors 185 and 187 are not equally strong, an alternating current signal is developed by chopping switch 188 and supplied as an error signal to the amplifier. The amplifier output drives attenuator 196 in a direction to make the two beams more nearly equal. When the system is balanced, the position of the attenuator disk corresponds to the opacity of sheet 20, provided that the characteristics of the sheet are uniform as between the two images 170 and 172. That opacity value can be indicated in any desired manner, as by the transducer 200, coupled to attenuator disk 196, and the meter 201, which may be remote from the rest of the apparatus if desired.

If sheet 20 is moved continuously, in the manner described in connection with FIG. 1, the average value of opacity obtained with the system of FIG. 12 corresponds accurately to the average that would be obtained with an instrument using a single illuminated area of the strip. In practice the response of the opacity measurement to local variations in the sheet can readily be eliminated by inserting a low pass filter of suitable time constant in line 191, as indicated schematically at 204; or by employing a meter 201 of slow pressure response characteristics. The meter then indicates a satisfactory average value. Alternatively, if a sufficiently rapid response is preserved throughout the system, the average opacity can readily be estimated visually on the meter, and the fast period variations of the meter further provide a measure of the degree of local variation of optical properties of the sheet.

Figure 14:
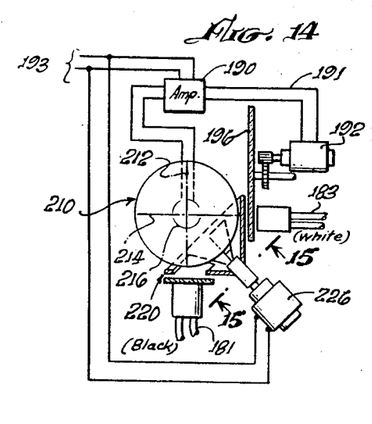
FIG. 14 is a fragmentary schematic drawing corresponding to a portion of FIG. 12 and representing a modification.
Figure 15:
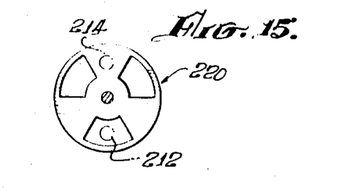
FIG. 15 is a section on line 15—15 of FIG. 14.

FIG. 14 is a schematic drawing representing an illustrative modification of a portion of the system of FIG. 12. Portions of the system not shown in FIG. 14 may be as shown in FIG. 12, the same numerals being used for directly corresponding parts. Light from the two sets of light pipes 181 and 183 is introduced into the integrating sphere 210 along respective axes 212 and 214. The illumination inside the sphere is sensed by a photoresponsive device indicated at 216, which "looks" into the sphere along a different axis, shown perpendicular to the paper. The signal from device 216 is supplied as an error signal to amplifier 190, which drives motor 192 and light attenuator disk 196 as in FIG. 12. The electrical chopper switch 188 of FIG. 12 is replaced in FIG. 14 by an optical shutter, shown illustratively as the conical shutter 220. The blade arrangement of shutter 220 is shown best in FIG. 15, wherein the intersections of the two light beams on axes 214 and 216 with the shutter are indicated in dashed lines. Shutter 220 is driven by a motor 226 in definite time relation to alternating current from which amplifier 190 derives a reference phase for demodulation of the error signal.

Shutter 220 admits the two light beams alternately into the integrating sphere, cutting off the other beam. Its function thus corresponds broadly to that of shutter 40 of FIG. 1, shutter and light attenuator 140 of FIG. 7 and electrical switch 188 of FIG. 12. It may be noted, however, that in FIGS. 12 and 14 that switching function not only switches the light responsive device effectively between two distinct light beams but also switches the effective backing of sheet 20 between "black" and "white." Hence in FIGS. 12 and 14 it is not necessary to synchronize two distinct switching devices.

Figure 16:
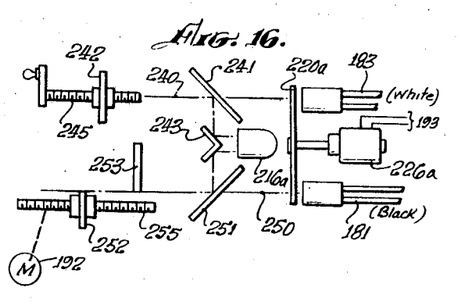
FIG. 16 is a fragmentary schematic drawing corresponding generally to FIG. 14 and representing a further modification.

In the further modification shown schematically in FIG. 16, light from the set of light pipes 183 forms a beam on the axis 240, passing through the partially reflecting mirror 241 to the mirror 242. That light is reflected by mirror 242 back along axis 240 to mirror 241 and is partially reflected thereby to oblique double mirror 243 and light sensor 216a. Mirror 242 is mounted on a carriage which is movable along ways, not shown, by the manually rotatable screw 245. Light from light pipes 181 similarly passes along the axis 250 through the partially reflective mirror 251, to which it is reflected back partly by the fixed mirror 253 and partly by the mirror 252, movable along axis 250 by the screw 255. The revolving shutter blade 220a is driven by motor 226a, causing sensor 216a to receive light alternately from the "white-backed" paper area (at 172 of FIG. 12) via light pipes 183 and mirror 242, and from the "black-backed" area 170 via light pipes 181 and mirrors 262 and 253. Mirror 252 is driven by the motor 192 under control of the error signal derived from sensor 216a as already described, the direction of drive being arranged to reduce the error signal.

The present system utilizes the general dependence of light intensity upon the inverse square of the distance of the sensor from the source, here represented by the exit end of the light pipe assembly. At high values of opacity, when the two beams are initially nearly equal, mirrors 242, 252 and 253 are typically positioned as indicated, with 253 forward of 242 and 252 back of 242, so that the effective average light path from pipes 181 is slightly less than that from pipes 183, leading to equal brightness at the sensor. At lower values of opacity, causing further decrease of the light from 181 relative to that from 183, mirror 252 is moved forward (to the right in FIG. 16) to reestablish balance.

An important advantage of the particular arrangement shown is that the inherent non-linearity of the inverse square dependence of light intensity upon distance is utilized to provide an expanded scale of opacity at values approaching 100 relative to lower values. That effect is obtained by balancing the system by movement of a mirror in the light that represents the apparent paper brightness with "black" backing. The variable light path is then longer at higher values of opacity, requiring greater linear movement to balance a given increment of opacity. The division of the light between a fixed mirror 253 and a movable mirror 252 enhances the scale expansion, since the relative travel of the movable mirror for a given change of opacity is thereby increased.

I claim:

1. A system for detecting variations in the opacity of a moving strip of sheet material, comprising in combination
   - a light source,
   - means for illuminating the front face of the moving strip with light from the source, a portion of the light being transmitted through the material,
   - sensing means responsive to the apparent diffuse reflectivity of the illuminated front face of the material,
   - light reflecting means and light absorbing means,
   - means acting to shift the system periodically between a first condition in which the light reflecting means is positioned behind the illuminated and sensed strip and a second condition in which the light absorbing means is positioned behind the illuminated and sensed strip,
   - means drivable to vary the intensity of light reaching the sensing means during one of said system conditions relative to that reaching the sensing means during the other system condition,
   - means for driving the light varying means under control of the sensing means to maintain effectively continuously a critical degree of light variation such that the sensing means response is equal for both said system conditions, and
   - means coupled to the light varying means for indicating effectively continuously the value of opacity that corresponds to said critical degree of light variation.

2. A system as defined in claim 1, and wherein said system shifting means comprise
   - structure mounting said light absorbing means and said light reflecting means adjacent the rear face of the strip opposite respective distinct regions of the illuminated front face thereof, and
   - means acting to shift the response of said sensing means periodically between said portions of the illuminated front face.

3. A system as defined in claim 1, and wherein said system shifting means comprise
   - structure fixedly mounting one of said light reflecting means and light absorbing means in opposedly spaced relation to the rear face of the illuminated material, and
   - means for periodically moving the other of said means into and out of light intercepting relation between the material and said one means.

4. A system as defined in claim 3, and wherein said intensity varying means comprise
   - optical means actuable to switch light passing from said source to said sensing means periodically between two alternative paths both of which include the front face of the strip,
   - structure for variably attenuating the light in one of said light paths, and
   - means for actuating said optical means in timed relation to said system shifting means.

5. A system as defined in claim 1, and wherein said light reflecting means comprise structure forming a cancave mirror of high reflectively for visible light spacedly opposing the rear face of the strip in the path of the transmitted light and in position to image at least a portion of the rear face of the illuminated strip upon itself, and
   said light absorbing means comprise a shutter of light absorbing material movable periodically into and out of light intercepting position between the mirror and the strip.

6. A system as defined in claim 1, and wherein
   said light absorbing means comprise structure forming a chamber having light absorbing walls and having an opening spacedly opposing the rear face of the strip in the path of the transmitted light, and
   said light reflecting means comprise a substantially plane specular reflector movable periodically into and out of light intercepting position between the chamber opening and the strip.

7. A system for measuring the opacity of sheet material, comprising in combination
   - a light source,
   - means for illuminating two regions of the front face of the material with light from the source, a portion of the light being transmitted through the material,
   - light absorbing means mounted adjacent the rear face of the material opposite one of said regions,
   - light reflecting means mounted adjacent the rear face of the material opposite the other said region,
   - a light responsive element,
   - optical means for collecting light from the front face of each of said illuminated regions and for producing respective light beams having intensities representing the apparent reflectivities thereof,
   - means for periodically and alternately directing said light beams as input to the light responsive element,
   - means for adjustably varying the intensity of the light received by the light responsive element from one of said beams relative to that received from the other beam to make the element response equal for the two beams, and
   - means for indicating the opacity that corresponds to the condition of adjustment of the last said means.

8. A system as defined in claim 7, and wherein said beam directing means comprise
   - a light integrating chamber having an output window exposed to the light responsive element, and two input windows for receiving the respecive light beams along angularly related beams axes, and
   - a conical shutter perpendicularly intersecting said axes for periodically and alternately interrupting the respective beams.

9. A system as defined in claim 7, and wherein said intensity varying means comprise
   - means for adjustably varying the effective path length of the light beam from the region having the light absorbing means adjacent its rear face,
   - whereby the opacity is a non-linear function of said variable path length, a given increment of path length corresponding to smaller increments of opacity as the opacity approaches 100.

10. A system for measuring the opacity of sheet material, comprising in combination,
    - a light source,
    - means for illuminating the front face of the material with light from the source, a portion of the light being transmitted through the material,
    - means shiftable periodically between a first condition in which light leaving the rear face of the illuminated sheet material is substantially wholly absorbed and a second condition in which such light is substantially wholly reflected back to the rear face of the material,
    - light sensing means, a plurality of elongated flexible light conductive elements having respective input ends and output ends, means supporting the input ends of the elements in a predetermined pattern of angularly spaced positions about the illuminated front face of the material to receive respective light samples therefrom, said pattern being such that the sum of said light samples effectively represents the full hemispherical distribution of light from that illuminated front face, means supporting the light sensing means in light receiving relation to the output ends of said elements, means for adjustably attenuating the light reaching the sensing means when said shiftable means is in a selected one of its said conditions to render the response of the sensing means independent of the condition of the shiftable means, and means driven with the attenuating means for indicating the value of opacity that corresponds to the condition of adjustment of the attenuating means.

11. A system as defined in claim 10, and wherein said illuminating means include shield means for illuminating an elongated area of the material, and the input ends of said elements are supported in angular distribution essentially in a plane perpendicular to the material and to the longitudinal axis of said elongated area, said angular distribution extending essentially through 180 degrees in that plane.

12. The method of measuring the opacity of a continuously moving sheet of material, comprising in combination the steps of illuminating the front faces of two adjacent regions of the moving sheet while one region is backed by a substantially light reflective surface and the other region is backed by a substantially light absorbing surface, comparing two light intensities that represent the apparent reflectivities of the illuminated front faces of the respective regions, variably attenuating one of said intensities to a critical degree that makes the two intensities equal, moving the sheet continuously in its plane to average any difference between said regions, and utilizing said critical degree of light attenuation as a measure of the opacity of the material.

13. The method of measuring the opacity of a continuously moving sheet of material, comprising in combination the steps of illuminating the front faces of two adjacent regions of the moving sheet while one region is backed by a substantially light reflective surface and the other region is backed by a substantially light absorbing surface, conducting light from the illuminated front faces of the respective regions alternately to a single light-measuring instrument.

variably attenuating the light reaching the instrument from one of the regions relatively to that reaching the instrument from the other region to a critical degree that makes the instrument responses to the two regions equal, moving the sheet continuously in its plane to average any differences between said regions, and utilizing said critical degree of light attenuation as a measure of the opacity of the material.

References Cited

UNITED STATES PATENTS

| Number | Date | Name | Class |
|---|---|---|---|
| 3,270,348 | 8/1966 | Lesage et al. | |
| 1,950,975 | 3/1934 | Davis. | |
| 2,759,602 | 8/1956 | Baigent | 250—227 X |
| 2,936,886 | 5/1960 | Harmon. | |
| 3,114,283 | 12/1963 | Gruner | 250—227 X |
| 3,163,700 | 12/1964 | Williamson | 350—96 X |
| 3,260,850 | 7/1966 | Bunge et al. | 250—227 X |

RONALD L. WIBERT, Primary Examiner

W. A. SKLAR, Assistant Examiner

U.S. Cl. X.R.

250—227, 228; 350—96; 356—205, 206